(No Model.)

J. B. PIKE.
BARREL HOOP CUTTING MACHINE.

No. 258,804. Patented May 30, 1882.

WITNESSES:
Fred. G. Dieterich
Jno. W. Stockett

Jno. B. Pike
INVENTOR,
by Louis Bagger & Co.
ATTORNEYS.

UNITED STATES PATENT OFFICE.

JOHN B. PIKE, OF PIKEVILLE, ONTARIO, CANADA.

BARREL-HOOP-CUTTING MACHINE.

SPECIFICATION forming part of Letters Patent No. 258,804, dated May 30, 1882.

Application filed October 2, 1880. (No model.)

*To all whom it may concern:*

Be it known that I, JOHN BENJAMIN PIKE, a British subject, residing at the village of Pikeville, in the township of Harwich, in the county of Kent, in the Province of Ontario, Canada, have invented a certain new and useful Improvement in Knives for Cutting Hoops from Plank, of which the following is a specification.

My invention relates to that class of knives which have for their object the cutting of hoops from plank, cut the proper thickness for the width of hoop required.

The object of my invention is to construct a knife in such a manner that it will cut the hoops from the plank, giving them the proper bevel, so that no material may be wasted in cutting, the table on which the plank rests remaining stationary. I attain this object in the manner illustrated in the accompanying drawings, in which—

Figure 1:
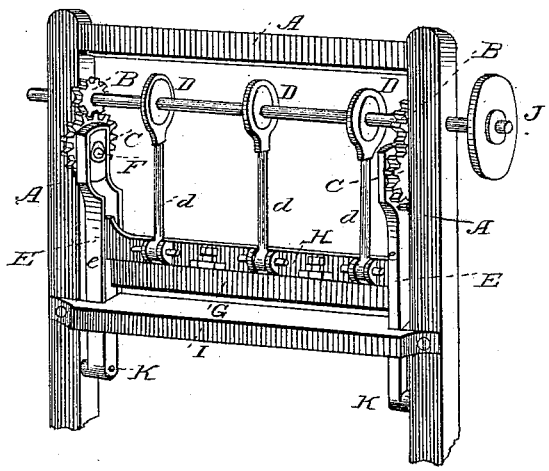
Figure 2:
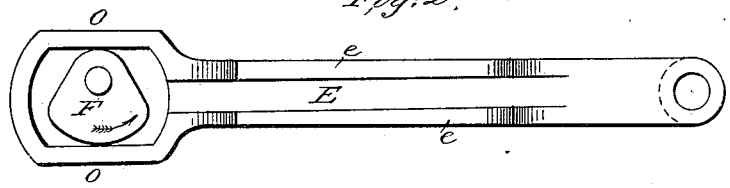

Figure 1 is a perspective view of that part of a machine which embodies my invention, and Fig. 2 is a plan of the knife-guide and cam which operates the same.

Similar letters of reference indicate corresponding parts.

The manner of its operation is as follows: Motion is imparted to the shaft L by means of the driving-pulley J. The shaft L carries eccentrics D, which are connected by rods $d$ to the knife-bar H, so that when the shaft is revolved it imparts to bar H, with its knife G, a reciprocating motion sufficient to cut the required thickness of hoop. The planks from which the hoops are cut are placed on the table I. As the table I is fixed, it follows that the simple up and down motion of the knife would cut hoops of uniform thickness throughout, which, as the hoops require to be beveled when finished, would incur a waste of timber. To obviate this it is necessary to give to the knife an oscillating along with the reciprocating motion imparted to it by means of the eccentrics D.

For this purpose shaft L is provided with a pinion or small cog-wheel, B B, at each end, inside of frame A, which mesh with other cog-wheels, C C, of twice their diameter, upon the faces of which are fixed cams F, which project into the slotted or open heads $o$ of the knife-guides E. The latter are made with parallel inwardly-projecting side flanges, $e$ $e$, which form ways for the knife-bar H, and are pivoted at their lower ends upon studs K K in the lower part of the side pieces of frame A. It follows that as the cog-wheels C, with their cams F, are rotated a vibratory or oscillating motion will be imparted to the knife-guides E E, and as the cog-wheels B are one-half the diameter of the wheels C with which they mesh, it is evident that if the relative positions of the cams, cog-wheels, and eccentrics on shaft L are properly arranged the knife-bar, with its knife, will make one stroke downward, cutting one hoop, when cam F is in the position shown in Fig. 2, and that it will make another stroke and cut downward when the cam has made one half-revolution, thus reversing the bevel on the hoops as these are being cut on table I, and so on alternately.

Having thus described my invention, I claim and desire to secure by Letters Patent of the United States—

The combination, in a machine for cutting and shaping hoops, of the frame A, having the fixed table I and studs K K, drive-shaft L, having eccentrics D and pinions B, connecting-rods or pitmen $d$, knife-bar H, oscillating guides E, having flanges $e$ and slotted heads $o$, and cog-wheels C, having cams F for operating said guides, all constructed and combined substantially as and for the purpose herein shown and specified.

JNO. B. PIKE.

Witnesses:
 JAMES DALGARNO,
 A. N. WILSON.